(12) United States Patent
Ahn

(10) Patent No.: US 9,704,142 B2
(45) Date of Patent: Jul. 11, 2017

(54) SYSTEM AND KIOSK APPARATUS FOR COLLECTING END-OF-LIFE MOBILE PHONES

(75) Inventor: Sang-Won Ahn, Namyangju-si (KR)

(73) Assignee: ECO-SAVE, INC., Seoul (KR)

(*) Notice: Subject to any disclaimer, the term of this patent is extended or adjusted under 35 U.S.C. 154(b) by 937 days.

(21) Appl. No.: 14/232,287

(22) PCT Filed: Jan. 11, 2012

(86) PCT No.: PCT/KR2012/000263
§ 371 (c)(1),
(2), (4) Date: Jan. 13, 2014

(87) PCT Pub. No.: WO2012/144724
PCT Pub. Date: Oct. 26, 2012

(65) Prior Publication Data
US 2014/0143161 A1    May 22, 2014

(30) Foreign Application Priority Data
Apr. 18, 2011 (KR) .................. 10-2011-0035801

(51) Int. Cl.
*G06K 15/00* (2006.01)
*G06Q 10/00* (2012.01)
(Continued)

(52) U.S. Cl.
CPC .............. *G06Q 10/30* (2013.01); *G06Q 50/26* (2013.01); *G07F 7/06* (2013.01); *Y02W 90/20* (2015.05)

(58) Field of Classification Search
CPC .......... G06K 15/00; G06K 19/00; G06K 7/10; G07F 17/00; G06F 7/08; G06Q 30/00; G06Q 10/00
(Continued)

(56) References Cited

U.S. PATENT DOCUMENTS

2008/0097853 A1* 4/2008 Kim ................ G06Q 30/02
                                                705/14.27
2010/0057924 A1* 3/2010 Rauber ............ G06Q 30/00
                                                709/229
(Continued)

FOREIGN PATENT DOCUMENTS

JP         2001-312551 A    11/2001
KR    10-2005-0034188 A     4/2005
(Continued)

*Primary Examiner* — Edwyn Labaze
(74) *Attorney, Agent, or Firm* — Revolution IP, PLLC

(57) ABSTRACT

A system for collecting end-of-life mobile phones includes a kiosk apparatus for performing an authentication procedure in which an authentication request is made using registration information including registrant information and end-of-life mobile phone information and a barcode label is issued when an authentication number is input according to the authentication request, and an identifying procedure for storing or discharging the end-of-life mobile phone by checking the presence of the barcode label attached thereto and identifying whether the mobile terminal is a normal mobile phone when the end-of-life mobile phone is put therein; and an integrated operation system having an operating system program to communicate with a plurality of kiosk apparatuses through a network, issue the authentication number corresponding to the authentication request of the kiosk apparatus, and check and statistically analyze an individual or integrated collection amount of kiosk apparatuses.

10 Claims, 22 Drawing Sheets

(51) Int. Cl.
*G06Q 50/26* (2012.01)
*G07F 7/06* (2006.01)

(58) Field of Classification Search
USPC .................. 235/383, 375, 487, 462.01, 381; 705/14.37, 306, 308
See application file for complete search history.

(56) References Cited

U.S. PATENT DOCUMENTS

2013/0046699 A1* 2/2013 Bowles .................. G06Q 10/00 705/306
2015/0324761 A1* 11/2015 Nguyen .................... G07F 7/06 705/308

FOREIGN PATENT DOCUMENTS

KR  10-2010-0121872 A  11/2010
KR  10-2011-0034340 A  4/2011

* cited by examiner

SYSTEM AND KIOSK APPARATUS FOR COLLECTING END-OF-LIFE MOBILE PHONES

CROSS REFERENCE TO PRIOR APPLICATIONS

This application is a National Stage Application of PCT International Patent Application No. PCT/KR2012/000263 filed on Jan. 11, 2012, under 35 U.S.C. §371, which claims priority to Korean Patent Application No. 10-2011-0035801 filed on Apr. 18, 2011, which are all hereby incorporated by reference in their entirety.

TECHNICAL FIELD

The present disclosure relates to a system for collecting end-of-life mobile phones, and more particularly, to a system and kiosk apparatus for collecting end-of-life mobile phones, which collects end-of-life mobile phones by using distributed kiosk apparatuses and has a compensation system for the collected end-of-life mobile phones.

BACKGROUND ART

Rapid development of electronic industries and IT technologies creates a new culture, called an information-oriented society, and mobile phones become necessaries.

Along with accelerated techniques, a mobile phone has been integrated with various functions such as a camera, a moving picture, a banking, Internet, MP3 or the like, which leads to great ripple effect, for example the change of structures of related industries.

Since 1984 in which a mobile phone was served for the first time in Korea, mobile phone users have continuously increased, the number of which has reached 49,608,721 in Korea (the survey material of the Korean Communications Commission, June 2010) and about 3.9 billion in the world, about 55% of the total population.

In particular, new functions and design changes of mobile phones create alternative demand to young consumers, which shortens the mobile phone change period.

This phenomenon accelerates discharge of end-of-life mobile phones, and the increase of end-of-life mobile phones has become a serious threatening element to the environment. Therefore, in view of the prevention of environmental contamination and the recycling of resources, much attention is being paid to appropriate collection and management of end-of-life mobile phones over the world.

—Detailed Cases of End-of-Life Mobile Phone Recycling in Various Countries—

In USA, the mobile phone recycling rule was enacted in 2004, and the mobile phone recycling rule has regulations about reuse, recycling and appropriate treatment of mobile phones.

In addition, In Europe, a mobile phone was included in the information communication device group (2005) in the Waste Electrical Electronic Equipment (WEEE), and a target recycling ratio is set to actively construct a methodical collecting and recycling system.

In Korea, a mobile phone was included as an item for the Extended Producer Responsibility (EPR) (2005), and producers are obligated to recycle a fixed quantity of end-of-life mobile phones every year.

In spite of the implementation of the above rules, the end-of-life mobile phone collect rate tends to decrease every year, and thus it is needed to develop a more efficient and more rational collection system. In fact, 1,600 end-of-life mobile phones are being generated every year, and as shown in FIG. 20, a very small amount of end-of-life mobile phones less than 1.2% (480,000/34,000,000) as an annual average has been collected during last four years.

—Environmental Problems Caused by End-of-Life Mobile Phones—

A mobile phone generally contains harmful substances such as lead, arsenic or the like and valuable metals such as gold, silver, cobalt or the like, though they differ depending on manufacturers, models, production time or the like.

Plastic, glass, iron, aluminum, cobalt, copper, nickels or the like are contained in a large quantity (1% or above), bromide, chrome, lead, cadmium, manganese, tungsten or the like are contained in a small quantity (0.1 to 1%), and antimony, arsenic, barium, gold, magnesium, palladium or the like are contained in a tiny quantity (less than 0.1%).

In addition, as shown in Table 1 below, LCD, a cladding, a PCB, a battery or the like of a mobile phone mostly contain harmful substances, which is a main cause of environmental pollution.

TABLE 1

| Component | Materials | Environmental effects |
|---|---|---|
| PCBs | FR4 board material | Environmental pollution caused by the use of polybrominated compounds |
|  | Pb soldering | Emission of harmful heavy metal Pb |
|  | Glass fiber | Low environmental effects |
|  | Epoxy resin | Low environmental effects |
|  | Various electronic parts | Emission of harmful heavy metals such as Cr, Be, Cd, Pb or the like |
|  | Cu | Substantially no environmental effect. |
| Battery | NiCd battery | Emission of Cd |
|  | Li ion battery | Emission of contaminants when Cu, Al, Co, Li or the like is wasted |
| LCD | aromatic compound | The entire LCD panel contains toxic substances |
| Cladding | Polycarbonate ABS mixture | Environmental pollution due to the difficulty in recycling |

Considering the above components and substances, an end-of-life mobile phone should be suitably collected and environment-friendly treated.

—Economic Effects According to Recycling of End-of-Life Mobile Phones—

Since mobile phones contain useful metals in addition to harmful substances mentioned above, if a systematic collecting network is constructed, various valuable metals may be obtained.

For example, 1 ton of mobile phones contains 280 g of gold (1 ton of gold ore contains 4 g of gold on average), which is about 70 times in comparison to the case of obtaining gold by smelting ore of the same weight. Therefore, end-of-life mobile phones are investigated as having great values in view of the use of resources.

In addition, mobile phones are also evaluated as having great business value since they contain a large quantity of valuable metals such as silver, palladium, rhodium, cobalt or the like in addition to gold, as shown in Table 2 below.

TABLE 2

| | Metals | | | | | |
|---|---|---|---|---|---|---|
| | Gold | Silver | Copper | Palladium | Rhodium | Cobalt |
| Components (g/EA) | 0.04 | 0.2 | 14 | 0.03 | 0.002 | 27.4 |

In addition, a monetary value of valuable metals obtained from one mobile phone is 3,560 won, and if 20% of end-of-life mobile phones (about 1 million) collected in 2010 is recycled, the recycled phones may give an economic value of about 712,000,000 won (see Table 3 below)

TABLE 3

| Metals | Contents of valuable metals (based on one mobile phone) | Unit price (won/g, calculated based on the data of the Korea Public Procurement Service in 2010) | Amount of money |
|---|---|---|---|
| Gold | 0.04 | 42,122 | 1684.9 |
| Silver | 0.2 | 595 | 119.0 |
| Copper | 14 | 0.9 | 12.6 |
| Palladium | 0.03 | 11,116 | 333.5 |
| Rhodium | 0.002 | 54632 | 1.9.3 |
| Cobalt | 27.4 | 47.5 | 1301.5 |
| Sum | | | 3560.89 |

Therefore, if end-of-life mobile phones are reused, it is possible to prevent primary environmental pollution occurring during a mobile phone production process and secondary environmental effects caused by the waste of the mobile phone, and also a good economic effect may be expected in view of resource saving.

However, even though forty recycling companies are in operation for collecting valuable metals in Korea, end-of-life mobile phones are collected together with other home appliances due to the shortage of end-of-life mobile phones.

End-of-life mobile phones have a very low collect rate among items included in the Extended Producer Responsibility recycling rule, in comparison to PET bottles having a collect rate of 76.4%, metal cans having a collect rate of 75.6%, glass bottles having a collect rate of 75.1%, batteries having a collect rate of 60% or the like, and in most cases, end-of-life mobile phones are collected through a one-shot event of a mobile communication company, an enterprise or a local government.

As shown in FIG. 21, in an existing end-of-life mobile phone collecting system, most mobile phones are collected through compensation sales due to the exchange of mobile phones or by post offices or local governments, and the collected end-of-life mobile phones are transferred to recycling companies, during which reusable mobile phones are distributed again as rental phones or secondhand mobile phones.

In spite of such a collecting system, the collect rate of end-of-life mobile phones is decreasing since consumers may not easily return end-of-life mobile phones and there is no suitable compensation system for the returned end-of-life mobile phones.

In addition, as shown in FIG. 22, most consumers up to 47% leave old mobile phones at home since they do not know how to treat an exchanged mobile phone or due to low compensation, and there are generally two or three mobile phones left alone at home. Like this, end-of-life mobile phones are accumulated, and as time goes, the end-of-life mobile phones become household waste.

<Problems of the Existing End-of-Life Mobile Phone Collecting System>

The existing end-of-life mobile phone collecting system described above has the following problems.

1) Absence of convenience in collecting—there is no much place where end-of-life mobile phones can be freely and conveniently collected, except for mobile phone agents.

2) Insufficient compensation system and low compensation—mobile phones are mostly collected as donation, and the interest in collection of end-of-life mobile phones is low due to low compensation and low deposit of manufacturers.

3) Leakage of personal information—since personal information may be leaked or illegally used when an end-of-life mobile phone is wasted, end-of-life mobile phones are not actively collected.

4) Imperfect or absent legislation—obligation to collect end-of-life mobile phones, centralization of collected old mobile phones and product recycling rules are practically insufficient.

Therefore, in order to lead neglected mobile phone to the recycling industry, it is needed to give a clear incentive to consumers, and it is also needed to develop compensation system and equipment by which everyone can easily and conveniently return or donate end-of-life mobile phones.

DISCLOSURE

Technical Problem

The present disclosure is designed to solve the problems of the related art, and therefore the present disclosure is directed to providing a system for collecting end-of-life mobile phones, which may include kiosk apparatuses distributed to convenient locations, manage the kiosk apparatuses of all locations through a network, and make compensation for end-of-life mobile phones collected through the kiosk apparatuses.

In addition, the present disclosure is also directed to providing a kiosk apparatus for collecting end-of-life mobile phones, which may be installed at a convenient location to collect end-of-life mobile phones, allow a user to easily return an end-of-life mobile phone, and automatically identify the returned end-of-life mobile phone to make compensation for the returned end-of-life mobile phone.

Technical Solution

In one aspect of the present disclosure, there is provided a system for collecting end-of-life mobile phones, which includes a kiosk apparatus for performing an authentication procedure in which an authentication request is made using registration information including registrant information and end-of-life mobile phone information and a barcode label is issued when an authentication number is input according to the authentication request, and an identifying procedure for storing or discharging the end-of-life mobile phone by checking the presence of the barcode label attached thereto and identifying whether the mobile terminal is a normal mobile phone when the end-of-life mobile phone is put therein; and an integrated operation system having an operating system program to communicate with a plurality of kiosk apparatuses through a network, issue the authentication number corresponding to the authentication request of the kiosk apparatus, and check and statistically analyze an individual or integrated collection amount of kiosk apparatuses.

The integrated operation system according to the present disclosure may include an integrated operation web server for communicating with the kiosk apparatus through the network to obtain collection information including a collection amount of end-of-life mobile phones in real time, operating a tool for checking and statistically analyzing an individual or integrated collection amount of kiosk apparatuses, and issuing the authentication number corresponding to the authentication request of the kiosk apparatus through a wireless network; an application server on which a program for counting an individual or integrated collection amount of kiosk apparatuses and statistically analyzing the collection amount to support the tool operated in the integrated operation web server is loaded; and a database server for storing the individual or integrated collection amount of kiosk apparatuses and the statistically analyzed data, managed by the application server.

Here, the integrated operation system may further include a mileage server, the mileage server may receive a mileage transmitted to the integrated operation web server by the kiosk apparatus, and the mileage of the end-of-life mobile phone may be accumulated in a compensation card of the registrant.

In addition, the kiosk apparatus for collecting end-of-life mobile phones according to the present disclosure may include a user interface panel having a touch screen and providing a user interface in association with the authentication procedure and the identifying procedure; a barcode printer for printing the barcode label; an authentication unit for making the authentication request when the registration information is transmitted; a modem for transmitting the authentication request to the integrated operation system and making real-time communication with the integrated operation system; a barcode printer for outputting a barcode label on which a barcode containing the registration information is printed when the authentication number corresponding to the authentication request is input to the user interface panel; a data storage unit for storing information provided through the user interface, the registration information and the data corresponding to the barcode; an identifying device for performing the identifying procedure in which the end-of-life mobile phone put therein is stored or discharged by checking the presence of the barcode label attached thereto and identifying whether the mobile phone is a normal mobile phone; and a control unit for providing the user interface to the user interface panel with reference to the information of the data storage unit, controlling the authentication unit to transmit the authentication request corresponding to the registration information through the modem while storing the registration information input from the user interface to the data storage unit, controlling the barcode printer to output the barcode label when the authentication number is input through the user interface panel, and controlling the identifying device to perform the identifying procedure.

Here, the identifying device may include a driving device having a motor for giving a rotation force and a conveyor driven by the rotation force, the driving device carrying an end-of-life mobile phone provided on the conveyor and changing a rotating direction of the motor according to an identification signal so that a normal end-of-life mobile phone is carried to a storage location and an abnormal end-of-life mobile phone is carried to a discharge location; a storage device disposed at the storage location to store the end-of-life mobile phone; a discharge device disposed at the discharge location to store an abnormal end-of-life mobile phone; a barcode scanner for scanning the barcode of the barcode label attached to the end-of-life mobile phone put by the driving device and providing the scanned barcode to the control unit; an authentication camera for obtaining a still image for authentication of the end-of-life mobile phone; a mobile phone identification sensor for sensing whether the end-of-life mobile phone put by the driving device is a normal end-of-life mobile phone and providing the sensing signal to the control unit; and a motor synchronization control unit for controlling the operation of the motor according to the control unit, receiving scan information input from the barcode scanner and the mobile phone identification sensor and identification information used for determining whether to store or discharge the end-of-life mobile phone according to the sensing signal from the control unit, and providing the identification signal to the driving device.

In addition, the storage device may be configured so that a height of a plate thereof on which the put end-of-life mobile phone is placed is adjusted according to a weight of collected end-of-life mobile phones, and the height of the plate may be adjusted by means of a spring or a bottom surface of the plate may be shaft-coupled to an electric motor so that the electric motor moves the plate upwards or downwards corresponding to the weight of collected end-of-life mobile phones.

In addition, when the end-of-life mobile phone is put onto the conveyor, the motor synchronization control unit may control the operation of the motor so that the end-of-life mobile phone reciprocates several times between the barcode scanner and the mobile phone identification sensor.

In addition, the kiosk apparatus may further include a human body sensor for sensing approach of the registrant, and when the human body sensor senses the registrant, the control unit may control the user interface panel to give a screen for demanding an input of the registration information.

In addition, the kiosk apparatus may further include a sponsorship advertisement storage unit for storing a sponsorship advertisement, and in a state where the human body sensor does not sense the registrant, the control unit may control so that the sponsorship advertisement of the sponsorship advertisement storage unit is provided to the user interface panel.

In addition, the kiosk apparatus may further include a compensation card reader for reading a compensation card possessed by the registrant, the control unit may store the compensation card information in the data storage unit to be included in the registrant information, and after the end-of-life mobile phone is stored in the storage device, the control unit may transmit a mileage, already allocated to each kind of the end-of-life mobile phone, to the integrated operation system to be accumulated in the compensation card.

Advantageous Effects

According to the present disclosure, since kiosk apparatuses for collecting end-of-life mobile phones may be distributed to convenient locations, a user may easily return an end-of-life mobile phone during daily life, for example using a subway or shopping at a major supermarket.

In addition, if an end-of-life mobile phone is returned to the kiosk apparatus, the user may receive a sufficient mileage corresponding to the returned end-of-life mobile phone, which motivates users to return end-of-life mobile phones and thus increases a collect rate of end-of-life mobile phones.

Moreover, since kiosk apparatuses installed at convenient locations may be managed through the Internet, a collection amount of end-of-life mobile phones may be efficiently managed and statistically analyzed.

Further, since the kiosk apparatus may collect an end-of-life mobile phone and accumulate a corresponding mileage for the user, end-of-life mobile phones may be collected more easily, which may resultantly solve environmental problems and give economic income as much as the collection amount of end-of-life mobile phones.

BEST MODE

The present disclosure discloses a system for collecting end-of-life mobile phones and a kiosk apparatus. Here, FIG. 1 is a block diagram showing a system for collecting end-of-life mobile phones according to an embodiment of the present disclosure, and FIG. 2 is a block diagram showing a kiosk apparatus for collecting end-of-life mobile phones according to an embodiment of the present disclosure.

Figure 1:
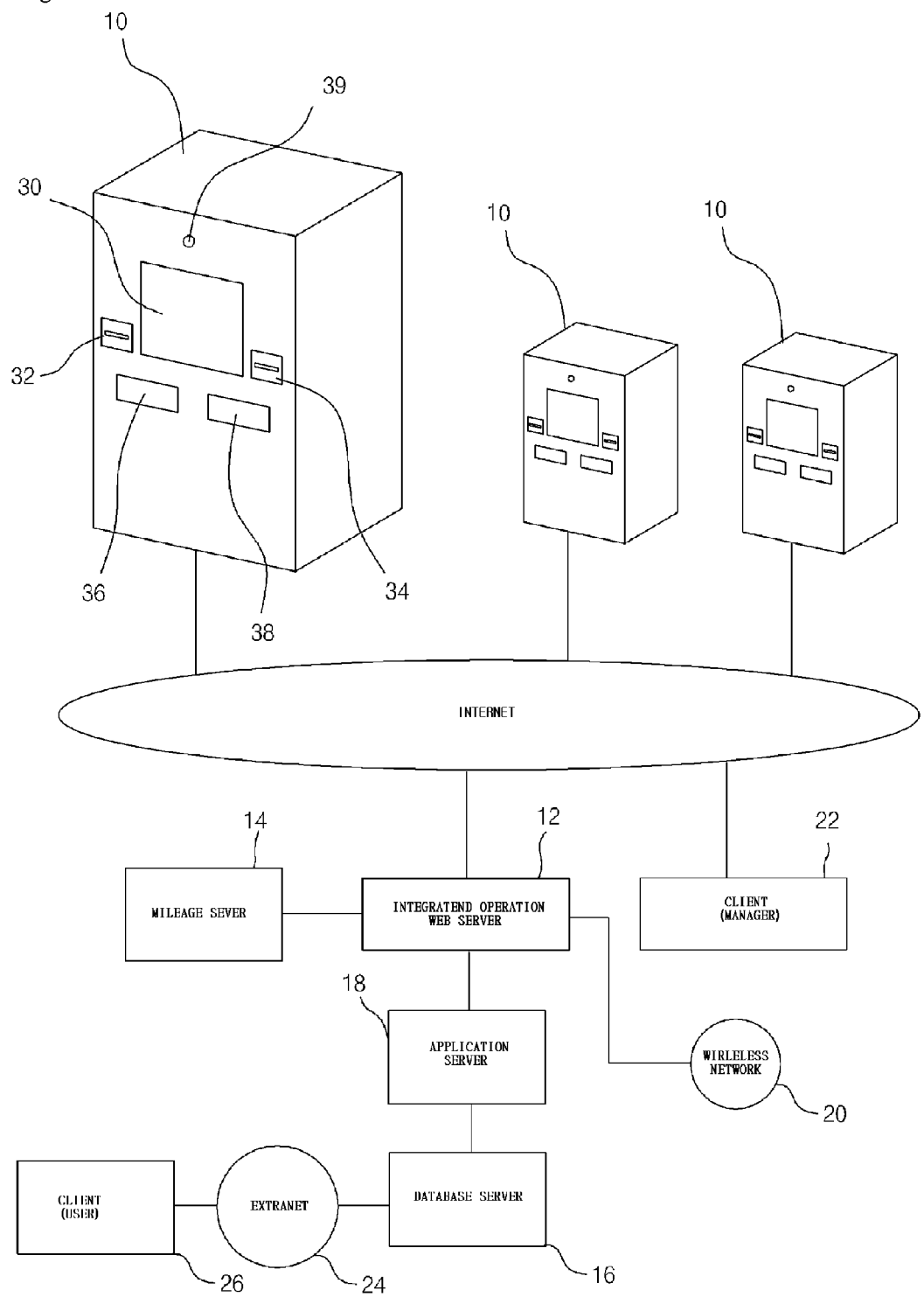
FIG. 1 is a block diagram showing a system for collecting end-of-life mobile phones according to an embodiment of the present disclosure.
Figure 2:
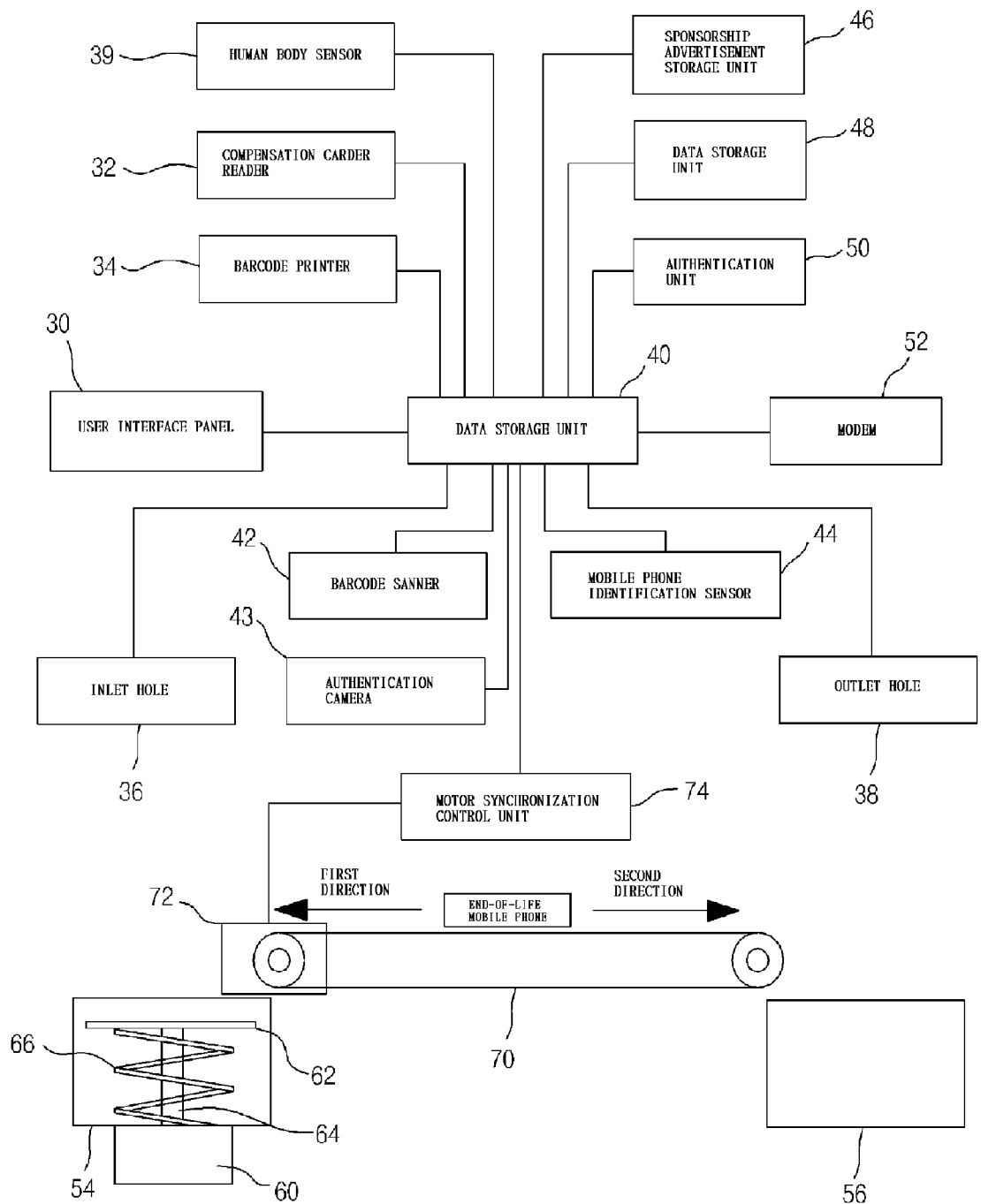
FIG. 2 is a block diagram showing a kiosk apparatus employed in the system of FIG. 1.
Figure 3:
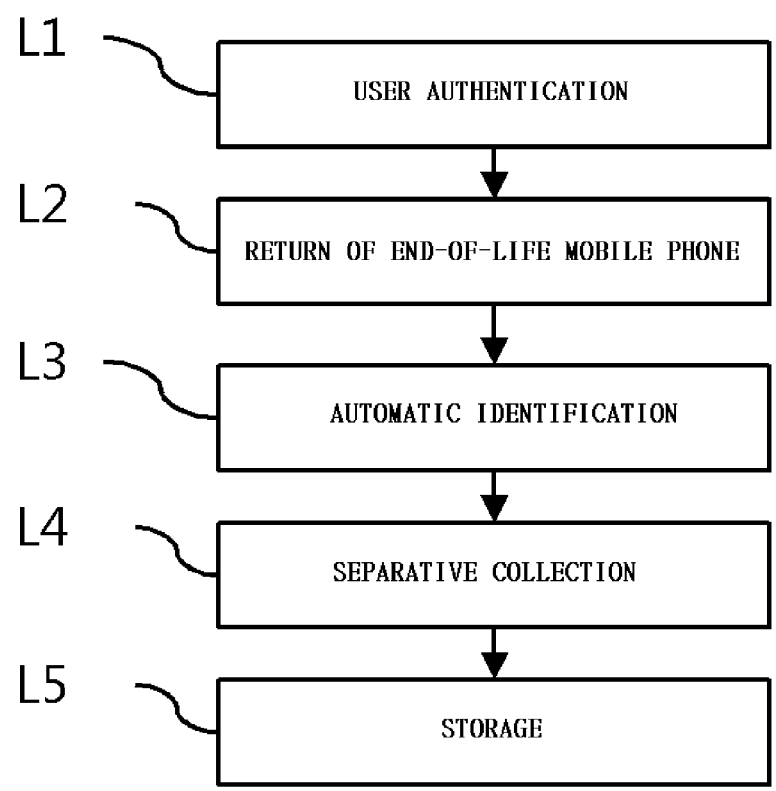
FIG. 3 is a process chart for illustrating a process for collecting end-of-life mobile phones according to an embodiment of the present disclosure.

According to the embodiment of FIGS. 1 and 2, an end-of-life mobile phone may be collected using the process of FIG. 3.

Figure 4:
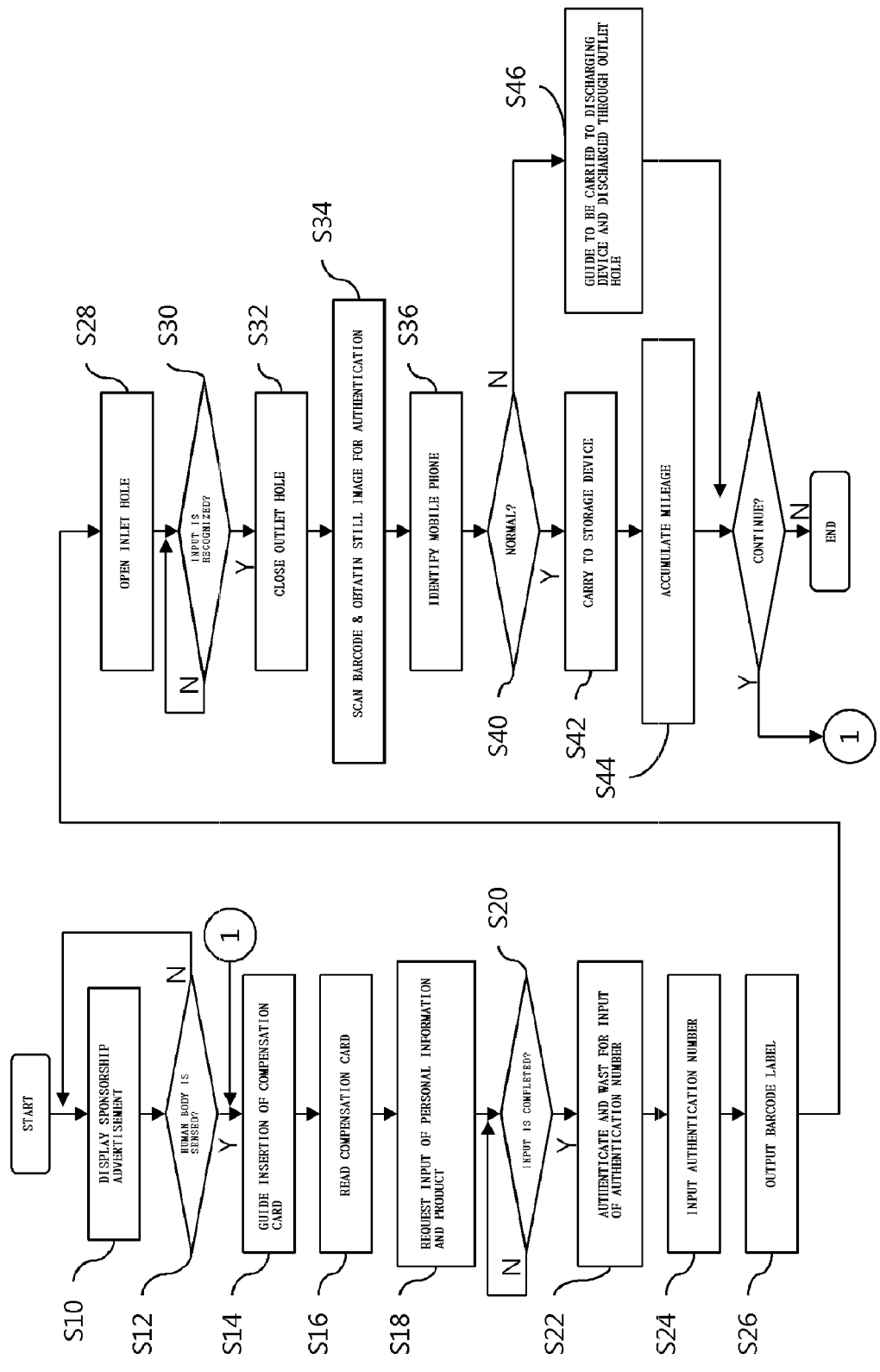
FIG. 4 is a flowchart for illustrating the order of collecting end-of-life mobile phones according to an embodiment of the present disclosure.

The end-of-life mobile phone collecting process according to an embodiment of the present disclosure is performed in the order of user authentication (L1), return of an end-of-life mobile phone (L2), automatic identification (L3), separative collection (L4) and storage (L5), and the process of FIG. 3 may be implemented according to the detailed flowchart of FIG. 4.

Kiosk apparatuses 10 according to an embodiment of the present disclosure may be disposed at various places which may be easily accessed by persons in daily life, for example subway stations, bus terminals, superstores or the like, and these kiosk apparatuses 10 may be connected to an integrated operation system through a network such as the Internet.

The kiosk apparatus 10 is configured to perform an authentication procedure in which an authentication request is made using registration information including registrant information and end-of-life mobile phone information and a barcode label is issued when an authentication number is input according to the authentication request, and an identifying procedure for storing or discharging the end-of-life mobile phone by checking the presence of the barcode label attached thereto and identifying whether the mobile terminal is a normal mobile phone when the end-of-life mobile phone is put therein.

For this, the kiosk apparatus 10 may include a user interface panel 30, a compensation card reader 32, a barcode printer 34, an inlet hole 36, an outlet hole 38 and a human body sensor 39, installed at a front side of its main body.

In this configuration, the user interface panel 30 may be a display device such as an LCD adopting a touch screen and has a touch screen function for sensing a touch of a registrant and a function of providing a user interface in association with the authentication procedure and the identifying procedure.

In addition, the compensation card reader 32 is a device for reading a recording medium such as a magnetic card or a smart card to collect an end-of-life mobile phone registered by the registrant and accumulate a mileage corresponding to the registered end-of-life mobile phone. The compensation card used by the registrant may be a general credit card or a membership card issued by a mobile communication company and having a function of accumulating a mileage to be used like cash.

Moreover, the barcode printer 34 prints a barcode on the barcode label, and if the registrant inputs an authentication number to the user interface panel 30, the barcode printer 34 prints the barcode label as described later.

In addition, the inlet hole 36 allows an end-of-life mobile phone to be put in, and the outlet hole 38 allows the end-of-life mobile phone put by the registrant to be discharged when the end-of-life mobile phone is determined as an abnormal mobile phone. The inlet hole 36 and the outlet hole 38 may be always open. However, different from the above, the inlet hole 36 may be closed at ordinary time and opened when a barcode label printed by the barcode printer 34 is output under the control of the control unit 40. In addition, the outlet hole 36 may be closed at ordinary time and opened when the end-of-life mobile phone put by the registrant is determined as an abnormal mobile phone under the control of the control unit 40.

Here, the abnormal mobile phone designates articles other than a mobile phone, for example a USB memory stick.

In addition, the human body sensor 39 senses an approach of a registrant to the kiosk apparatus 10 and outputs a sensing signal, and the human body sensor 39 may be a general proximity sensor.

Meanwhile, the integrated operation system connected to the kiosk apparatus 10 through a network may have an operating system program to communicate with a plurality of kiosk apparatuses 10 through a network, issue an authentication number corresponding to the authentication request of any kiosk apparatus 10, and check and statistically analyze an individual or integrated collection amount of kiosk apparatuses.

The network between the kiosk apparatus 10 and the integrated operation system may be a wired/wireless Internet, a public wireless network or a dedicated network.

In addition, the integrated operation system may include an integrated operation web server 12, a mileage server 14, a database server 16 and an application server 18.

Here, the integrated operation web server 12 has functions of communicating with the kiosk apparatus 10 through the network to obtain collection information including a collection amount of end-of-life mobile phones in real time, operating a tool for checking and statistically analyzing an individual or integrated collection amount of kiosk apparatuses, and issuing an authentication number corresponding to the authentication request of the kiosk apparatus 10 through a wireless network 20.

Here, the tool for checking and statically an individual or integrated collection amount of kiosk apparatuses 10 is supported by the application server 18, and the application server 18 has a program, loaded thereon, for counting an individual or integrated collection amount of kiosk apparatuses 10 and statistically analyzing the collection amount to support the tool operated in the integrated operation web server.

In addition, the individual or integrated collection amount of kiosk apparatuses 10 and the statistically analyzed data, managed by the application server 18, are stored in the database server 16.

In this configuration, the application server 18 uses an operating program which is executed with reference to the individual or integrated collection amount of the kiosk apparatuses 10 or the statistically analyzed data, stored in the database server 16, and the operating program of the application server 18 supports the tool provided by the integrated operation web server 12 on the Internet.

Here, the tool gives a function for a manager accessible to the Internet to access as a client 22 so as to check an individual or integrated collection amount of the kiosk apparatuses 10 and statistically analyzing the collection amount and a function of providing an interface for inquiry.

Meanwhile, the database server 16 may be shared with a separate extranet 24 and allow a user to access as a client 26 through the extranet 24. Therefore, an operator of a subway or a superstore which operates the kiosk apparatus 10 has a right of a user, and the user may use the function of checking an individual or integrated collection amount of the kiosk apparatus 10, corresponding to a management object thereof, and statistically analyzing the collection amount. Here, the statistic analysis may be performed different according to the kind of the end-of-life mobile phone.

In addition, the mileage server 14 has a function of receiving a mileage transmitted to the integrated operation web server 12 by the kiosk apparatus 10 and accumulating the mileage of each collected end-of-life mobile phone to a compensation card of the registrant.

In the system for collecting end-of-life mobile phones according to the present disclosure, as described above, the kiosk apparatus 10 may be described with reference to FIG. 2, and among components depicted in FIG. 2, any component identical to that of FIG. 1 is designated by the same reference numeral and not described in detail here.

The user interface panel 30, the compensation card reader 32, the barcode printer 34, the inlet hole 36, the outlet hole 38 and the human body sensor 39, described above with reference to FIG. 1, are mounted to the exterior of the main body of the kiosk apparatus 10, and a control unit 40, a barcode scanner 42, an authentication camera 43, a mobile phone identification sensor 44, a sponsorship advertisement storage unit 46, a data storage unit 48, an authentication unit 50, a modem 52, a storage device 54, a discharge device 56, a conveyor 70, a motor 72 and a motor synchronization control unit 74 are included in the interior of the main body of the kiosk apparatus 10.

Here, the barcode scanner 42, the authentication camera 43, the mobile phone identification sensor 44, the storage device 54, the discharge device 56, the conveyor 70, the motor 72 and the motor synchronization control unit 74 may be classified as an identifying device, and the identifying device performs the identifying procedure for checking the presence of a barcode label attached to an end-of-life mobile phone put therein, obtaining an image for authentication, identifying whether the put end-of-life mobile phone is a normal mobile phone, and then storing or discharging the end-of-life mobile phone.

In this configuration, the sponsorship advertisement storage unit 46 stores an sponsorship advertisement to be provided to the user interface panel 30, and the data storage unit 48 stores the information to be provided to the user interface panel 30 as a user interface, the registration information and the data corresponding to the barcode.

In addition, if the registration information is transmitted through the control unit 40, the authentication unit 50 makes an authentication request.

Moreover, the modem 52 is configured to transmit the authentication request, received through the control unit 40, to the integrated operation web server 12 of the integrated operation system connected to the Internet, and to perform real-time communication with the integrated operation web server 12.

Meanwhile, if the human body sensor 39 does not senses that a registrant approaches the kiosk apparatus 10, the control unit 40 provides the sponsorship advertisement of the sponsorship advertisement storage unit 46 to the user interface panel 30.

In addition, if a signal of sensing an approach of a registrant to the kiosk apparatus 10 is input by the human body sensor 39, the control unit 40 controls the user interface panel 30 to give a screen for demanding the input of the registration information to the registrant.

Moreover, the control unit 40 provides a user interface to the user interface panel 30 with reference to the information of the data storage unit 48, and stores the registration information of the registrant, input through the user interface, in the data storage unit 48.

In addition, the control unit 40 stores the registration information in the data storage unit 48 and controls the authentication unit 50 to transmit an authentication request corresponding to the registration information to the integrated operation web server 12 through the modem 52.

Moreover, if an authentication number corresponding to the authentication request is input through the user interface panel 30, the control unit 40 controls the barcode printer 34 to print a barcode on a barcode label and output the printed barcode label.

Meanwhile, among the components of the identifying device, the motor 72 for giving a rotation force and the conveyor 70 driven by the rotation force are included in a driving device, and the motor 72 is controlled by the motor synchronization control unit 74.

In other words, the motor synchronization control unit 74 controls the operation of the motor 72 under the control of the control unit 40, and the motor synchronization control unit 74 receives the identification information, generated to determine whether to store or discharge the end-of-life mobile phone with reference to the scan information and the sensing signal input from the barcode scanner 42 and the mobile phone identification sensor 44, from the control unit 40. In other words, by the identification information of the control unit 40, the motor synchronization control unit 74 operates the motor 72 to store or discharge the end-of-life mobile phone. Accordingly, the rotating direction of the conveyor 70 may be shifted to a first direction disposed at a storage location where the storage device 54 for storing an end-of-life mobile phone is provided and a second direction disposed at a discharge location where the discharge device 56 for storing an abnormal end-of-life mobile phone is provided.

In addition, the barcode scanner 42, the authentication camera 43 and the mobile phone identification sensor 44 are disposed on the conveyor 70, and the barcode scanner 42 scans the barcode of the barcode label attached to the end-of-life mobile phone put onto the conveyor 70 and provides the scanned barcode to the control unit 40. Moreover, the authentication camera 43 obtains one frame of a mobile phone still image for authentication, which includes the barcode label attached to the mobile phone, and the mobile phone identification sensor 44 senses whether the end-of-life mobile phone put onto the conveyor 70 is a normal end-of-life mobile phone and provides the sensing signal to the control unit 40.

Here, the inlet hole 36 may be located at the center of the conveyor 70, and when a cover is installed thereto, the cover may be configured to be opened or closed under the control of the control unit 40. In addition, the outlet hole 38 may be formed at a location where the discharge device 56 is disposed or be integrated with the discharge device 56, and when a cover is installed thereto, the cover may be configured to be opened or closed under the control of the control unit 40.

Moreover, the storage device 54 may be configured so that a height of a plate 62 on which the put end-of-life mobile phone is placed is adjusted according to a weight of collected end-of-life mobile phones. For this, the bottom surface of the plate 62 may be supported by a spring 66 to adjust its height. Different from this, the plate 62 may also be configured so that the bottom surface thereof is coupled by a shaft 64 to an electric motor 60, and the electric motor 60 moves the plate upwards or downwards corresponding to the weight of the collected end-of-life mobile phones. When the electric motor 60 is used, a sensor for sensing a location of the plate 62 or a weight of the end-of-life mobile phones may be provided to the storage device 54, and the electric motor 60 may be controlled by the sensing signal of the sensor to move the plate upwards or downwards.

Meanwhile, if an end-of-life mobile phone is put onto the conveyor 70, the motor synchronization control unit 74 may control the motor 72 so that the end-of-life mobile phone reciprocates several times between the barcode scanner 42 and the mobile phone identification sensor 44. If the operation of the conveyor 70 is controlled by the motor synchronization control unit 74 in this way, the barcode scanner 42 may repeatedly scan a barcode several times, and the mobile phone identification sensor 44 may also repeatedly sense an end-of-life mobile phone several times.

In addition, the mobile phone identification sensor 44 may include a plurality of sensors for sensing specific features of a mobile phone, and the features of the mobile phone may include a surface reflectance, detection of a specific metal component commonly included in a mobile phone, a magnetic flux density of a magnet commonly included in a mobile phone, or the like.

Since the system and kiosk apparatus for collecting end-of-life mobile phones is configured as described above according to the embodiment of the present disclosure, the process for collecting end-of-life mobile phones may be performed in the order of user authentication (L1), return of an end-of-life mobile phone (L2), automatic identification (L3), separative collection (L4) and storage (L5), as shown in FIG. 3. Hereinafter, the process for collecting end-of-life mobile phones will be described with reference to FIGS. 4 to 16. The operations of the kiosk apparatus 10, described below, are performed when the control unit 40 controls each component.

First, in a common state where a registrant is not sensed by the human body sensor 39, the kiosk apparatus 10 provides the sponsorship advertisement of the sponsorship advertisement storage unit 46 to the user interface panel 30 so that the sponsorship advertisement is displayed. (S10).

While displaying the sponsorship advertisement, the kiosk apparatus 10 repeatedly checks whether the human body sensor 39 senses a human body (a registrant) (S12).

Figure 5:
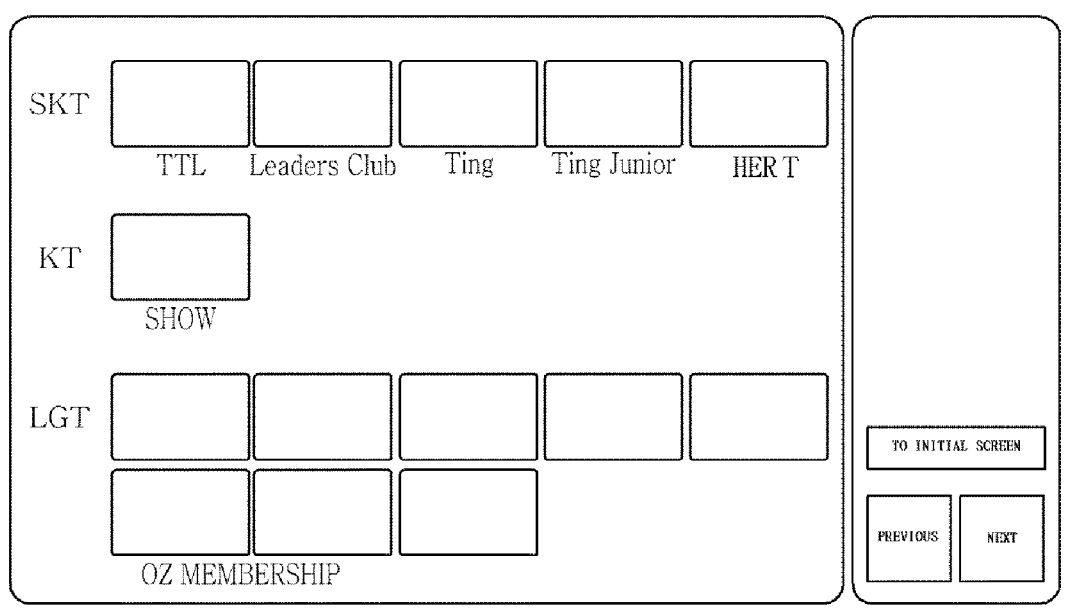
FIGS. 5 to 16 are diagrams showing screens displayed on a user interface panel of the kiosk apparatus when an end-of-life mobile phone is collected according to an embodiment of the present disclosure.
Figure 6:
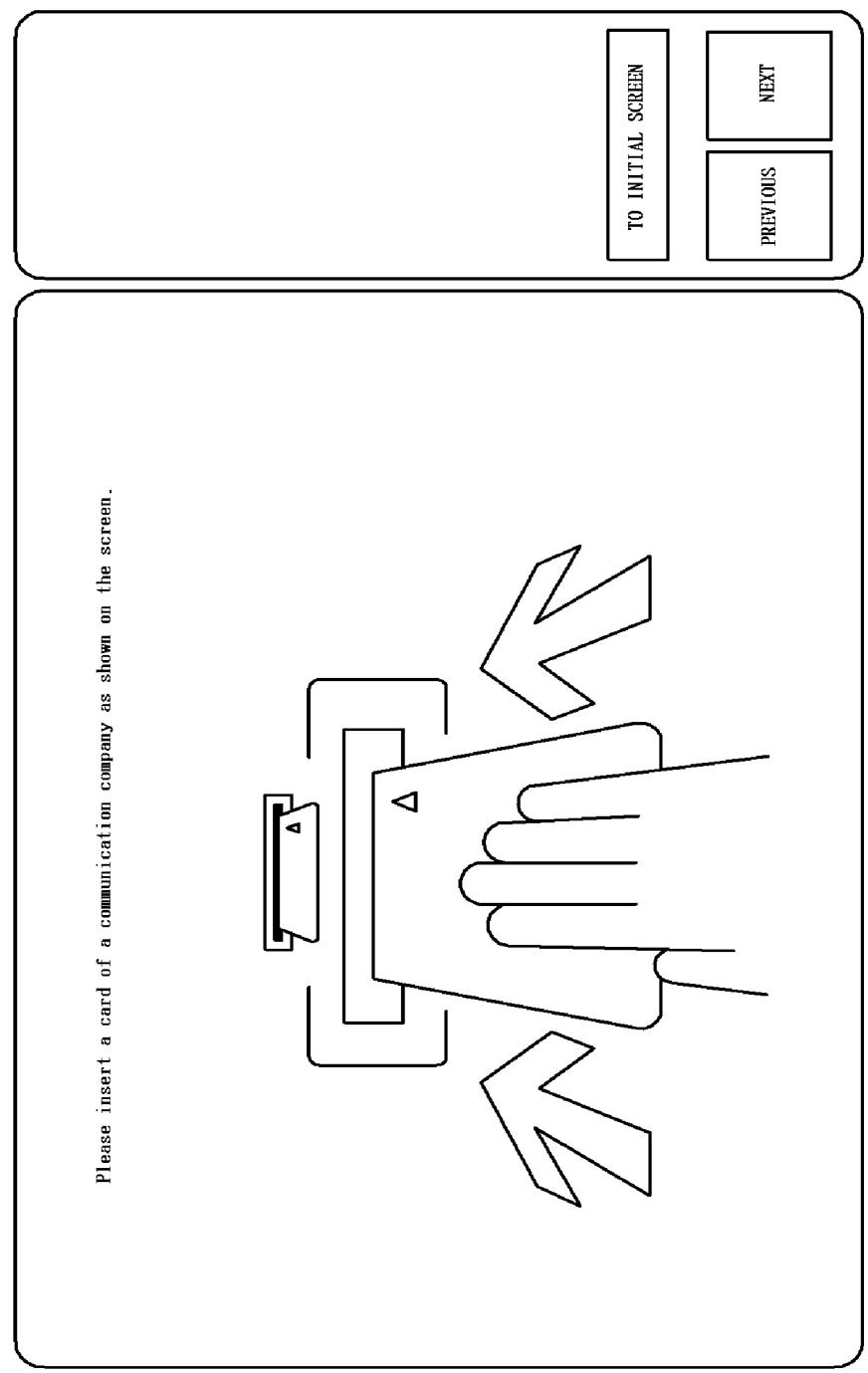

If a registrant is located at the kiosk apparatus 10 to collect an end-of-life mobile phone, the kiosk apparatus 10 may stop displaying the sponsorship advertisement and give a user interface for guiding the registrant to select a compensation card as shown in FIG. 5 and then insert the compensation card as shown in FIG. 6 (S14).

The registrant selects a compensation card at the user interface of FIG. 5, and if the guidance screen of FIG. 6 is output to the user interface panel 30, the registrant inserts the compensation card into the compensation card reader 32. The compensation card reader 32 reads the compensation card of the registrant to check necessary information (a card number or the like) and stores the information in the data storage unit 48 through the control unit 40 (S16).

After that, the kiosk apparatus 10 requests the registrant to input personal information and product information (S18). Here, the personal information may include a mobile phone number of the registrant in order to receive an authentication number by an SMS during the authenticating process, and for the input of the mobile phone number, a user interface as shown in FIG. 7 may be provided to the user interface panel 30.

Figure 7:
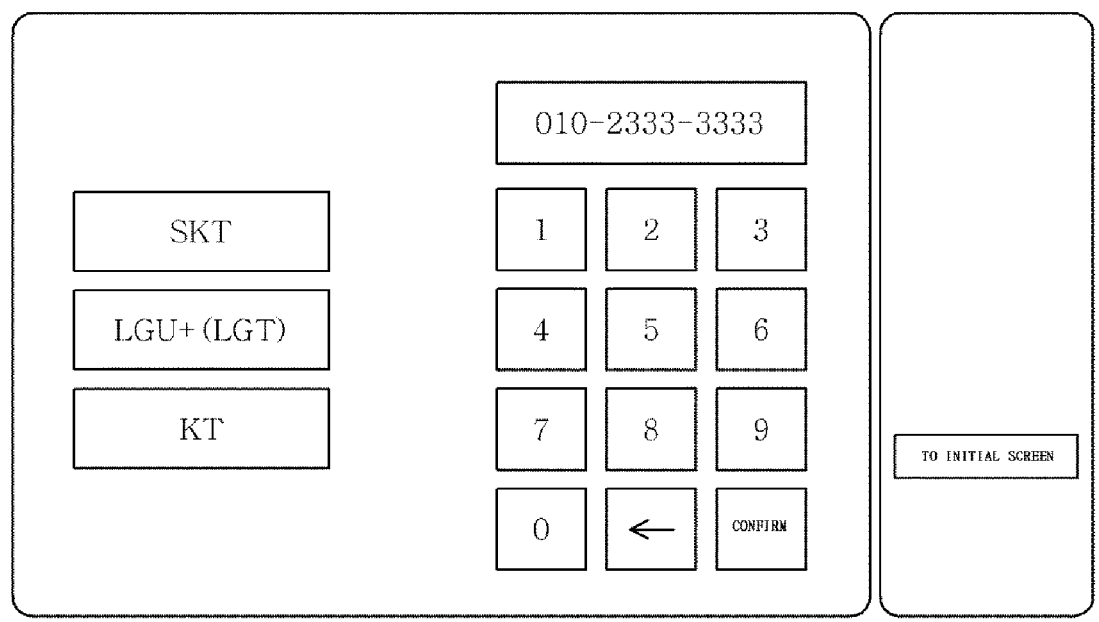
Figure 8:
Figure 9:
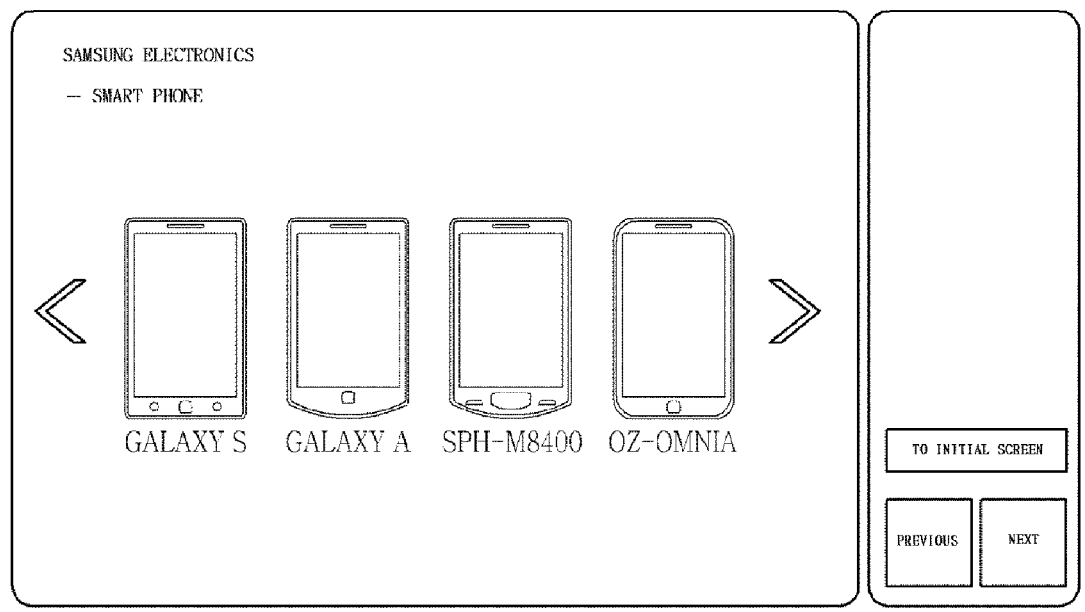
Figure 10:
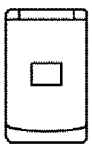

If the registrant inputs his mobile phone number in FIG. 7, a user interface for guidance as shown in FIG. 8 may be provided to the user interface panel 30 for checking the registrant by combining the information read from the compensation card with the mobile phone number, and after that, a user interface for requesting an input of product information of the end-of-life mobile phone to be collected as shown in FIG. 9 may be provided to the user interface panel 30. The registrant may select an end-of-life mobile phone to be collected by manipulating the user interface of FIG. 9. If the end-of-life mobile phone to be collected is selected using the user interface of FIG. 9, a user interface for checking the end-of-life mobile phone selected by the registrant as shown in FIG. 10 may be provided under the control of the control unit 40, and points of a mileage for the selected end-of-life mobile phone may also be checked together.

Here, the mobile phone information stored in the data storage unit 48 is provided, and the points of a mileage correspond to an amount of money to be accumulated to the compensation card of the registrant after the end-of-life mobile phone is returned.

In the above, the information of the compensation card and the mobile phone number of the registrant may be defined as registrant information.

Figure 11:
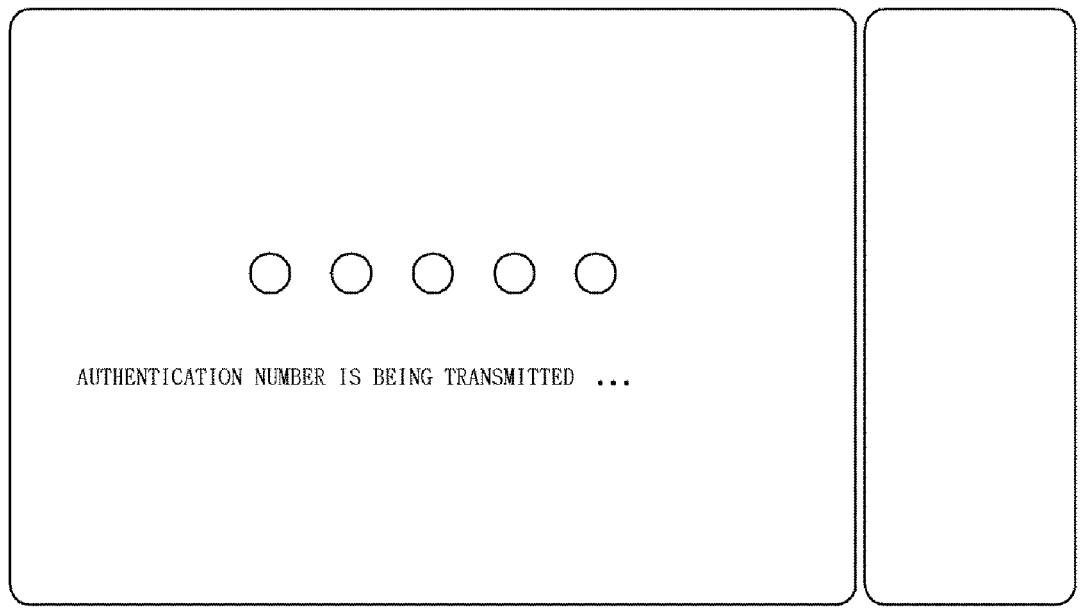

If the registration information including the registrant information and the end-of-life mobile phone information are completely input (S20), the control unit 40 controls the authentication unit 50 for authentication (S22). At this time, the user interface panel 30 may display a standby screen as shown in FIG. 11.

If the registration information is provided from the control unit 40, the authentication unit 50 may make a corresponding authentication request via the control unit 40 and the modem 52 to the integrated operation web server 12 connected to the Internet, and the integrated operation web server 12 may transmit the authentication number corresponding to the authentication request to a mobile phone number registered by the registrant through the wireless network 20 by means of an SMS.

If receiving a confirmation message notifying that the authentication number is transmitted from the integrated operation web server 12 to the registrant through the wireless network 20 by means of real-time communication, the authentication unit 50 waits until the registrant inputs the authentication number. At this time, the control unit 40 provides a user interface of FIG. 12 to the user interface panel 30 and waits.

Figure 12:
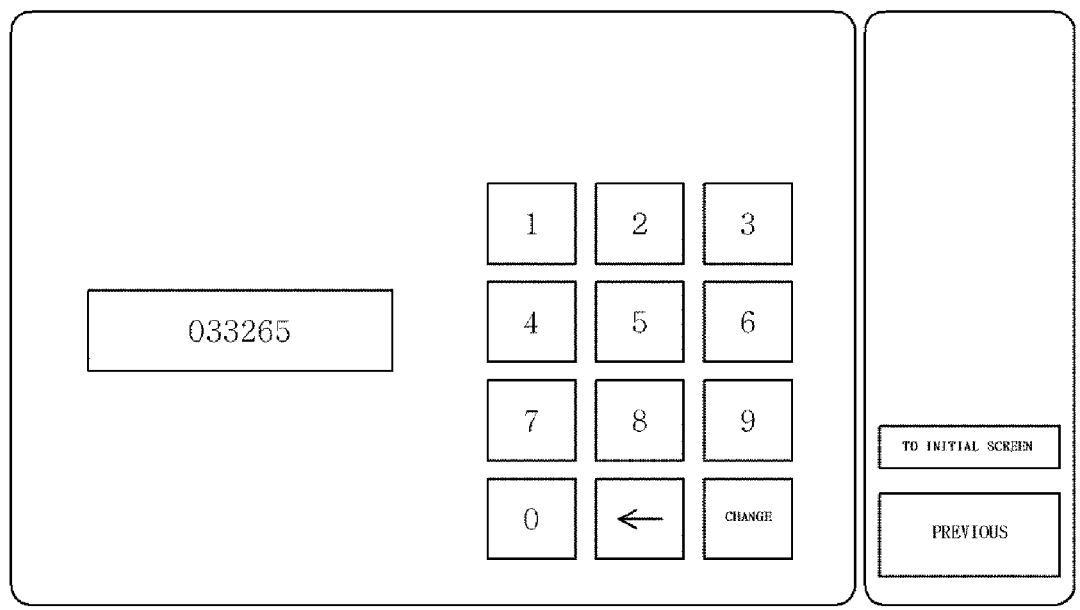
Figure 13:
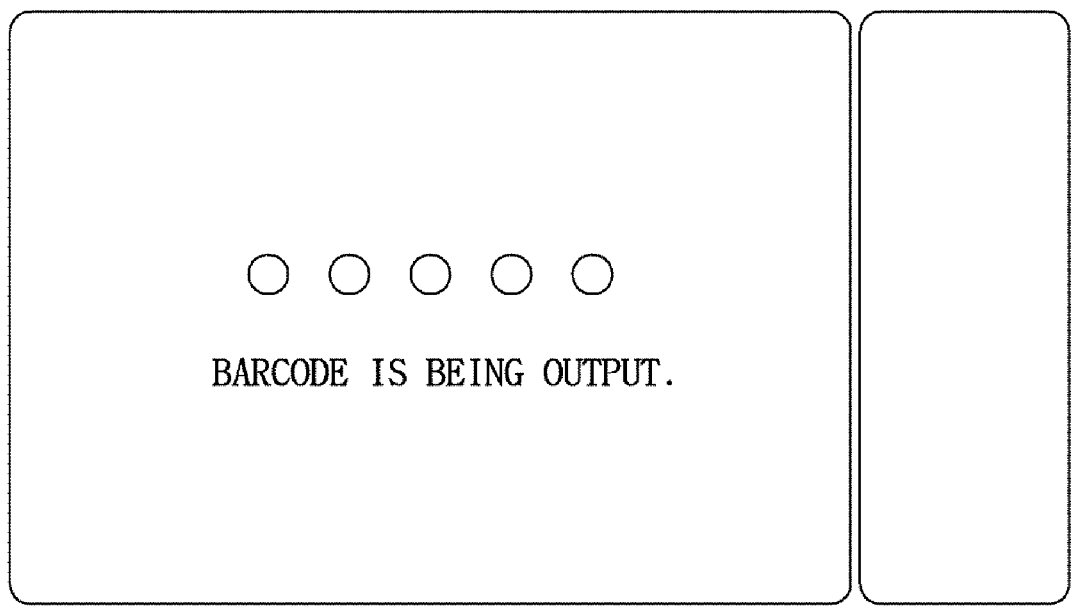
Figure 14:
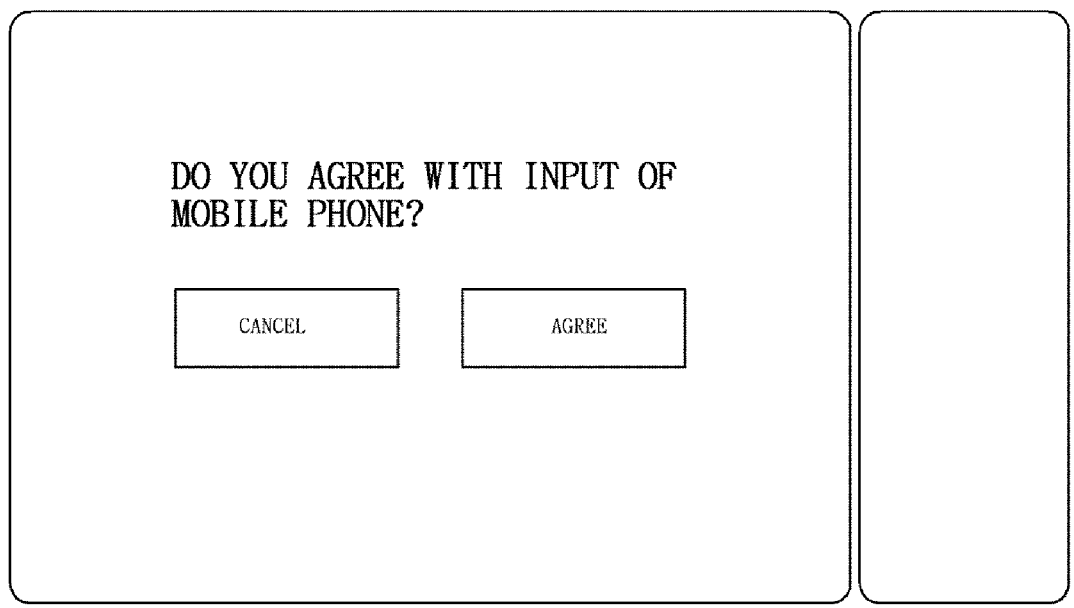

If the authentication number is received to the mobile phone of the registrant, the registrant inputs the authentication number through the user interface of FIG. 12 (S24).

If the registrant inputs the authentication number, the control unit 40 checks whether the authentication number input by the registrant is identical to the authentication number issued by the integrated operation web server 12. If so, the control unit 40 gives a user interface of FIG. 13 to the user interface panel 30 and then transmits the registration information stored in the data storage unit 48 to the barcode printer 34 so that a barcode label having a printed barcode is output (S26).

At this time, if a cover is provided to the inlet hole 38, the control unit 48 may open the inlet hole 38 (S28).

In addition, the barcode label output during the above process is attached to the end-of-life mobile phone to be returned by the registrant.

Figure 15:
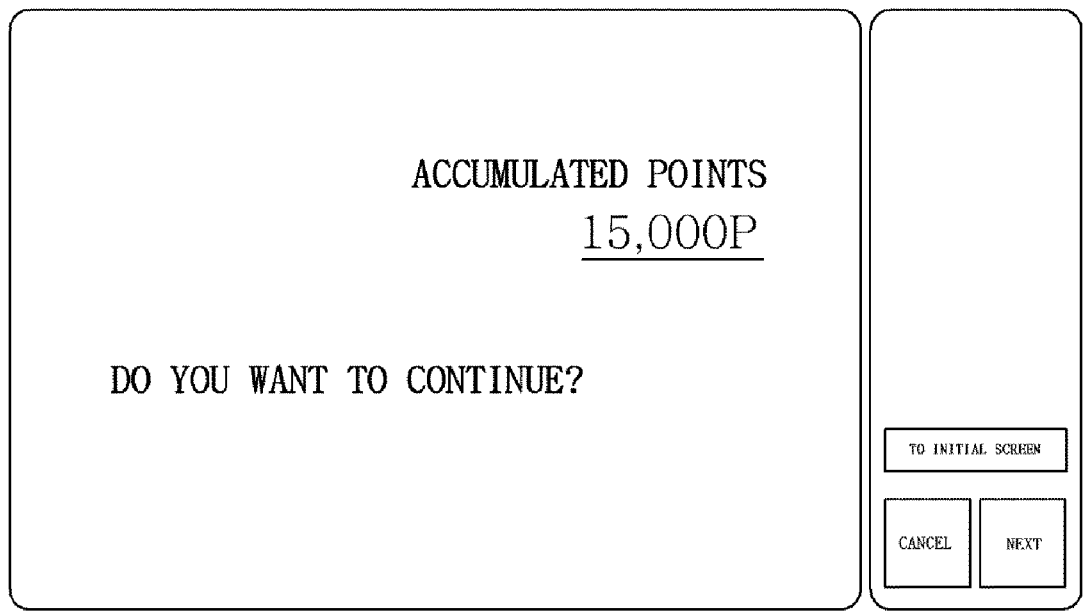
Figure 16:
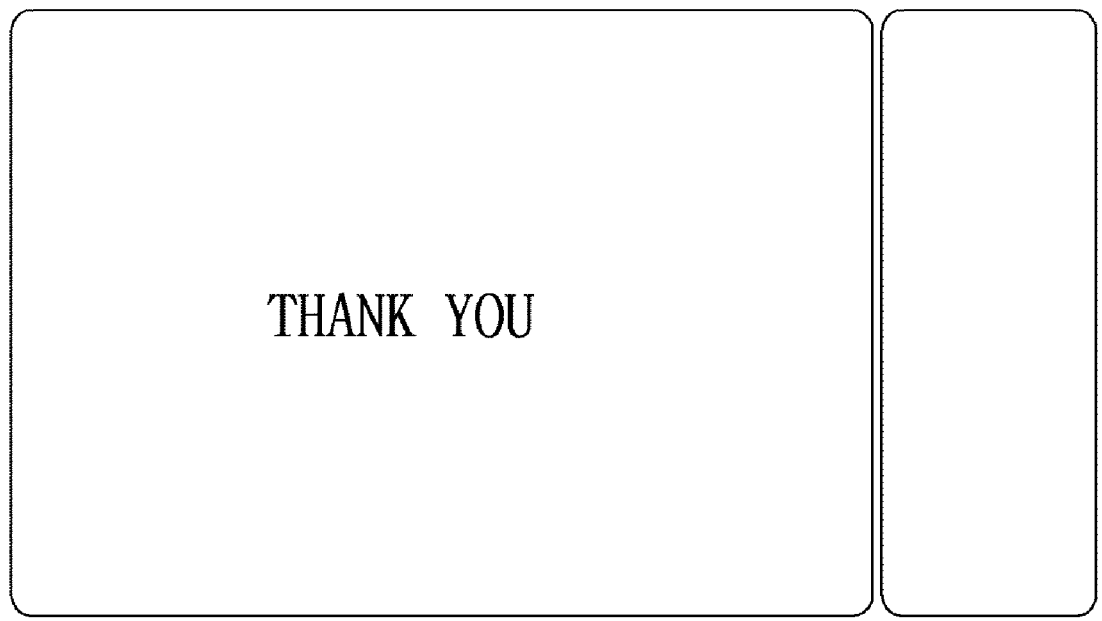

After the inlet hole 38 is opened, if the registrant puts the end-of-life mobile phone, the put end-of-life mobile phone is recognized (S30), and the inlet hole 38 is closed (S32). At this time, in a state where the inlet hole 38 is opened, the control unit 40 may further perform a process of giving a user interface of FIG. 14 to check whether the registrant agrees with the return of the mobile phone and a process of checking accumulated points of the registrant for the end-of-life mobile phone and checking whether the registrant wants to proceed further as shown in FIG. 15.

In addition, the put end-of-life mobile phone may be recognized by installing a sensor to the inlet hole 38.

If the end-of-life mobile phone is put through the inlet hole 38 as described above, the end-of-life mobile phone is carried onto the conveyor 70, and the conveyor belt 70 repeatedly reciprocates the end-of-life mobile phone two or three times in the first and second directions to cover a range where the barcode scanner 42, the authentication camera 43 and the mobile phone identification sensor 44 are installed. The reciprocating operation of the conveyor 70 may be performed when the motor synchronization control unit 74 drives the motor 72 under the control of the control unit 40.

In a state where the end-of-life mobile phone is on the conveyor 70, the barcode scanner 42 scans a barcode of the barcode label attached to the end-of-life mobile phone (S34), and the mobile phone identification sensor 44 identifies the mobile phone. At this time, the authentication camera 43 may obtain one frame of a still image for authentication, which includes the barcode label attached to the end-of-life mobile phone, and the photographing location may be controlled using a sensor. The still image for authentication obtained by the authentication camera 43 may be used as an evidential material against a dispute of customer in relation to charges.

The barcode scanner 42 checks by scanning whether the barcode label is normally attached to the end-of-life mobile phone.

In addition, the mobile phone identification sensor 44 identifies whether the end-of-life mobile phone is an abnormal mobile phone, by recognizing a surface reflectance, detection of a specific metal component commonly included in a mobile phone, a magnetic flux density of a magnet commonly included in a mobile phone or the like as features of the mobile phone. The mobile phone identification sensor 44 may include a plurality of sensors and be set to output a sensing signal recognizing the put end-of-life mobile phone as an abnormal mobile phone when all sensors sense the put end-of-life mobile phone is an abnormal mobile phone or to output a sensing signal recognizing the put end-of-life mobile phone as an abnormal mobile phone when at least one sensor senses the put end-of-life mobile phone is an abnormal mobile phone. This may be adjusted by a manufacturer.

The control unit 40 determines whether the end-of-life mobile phone is normal with reference to the scanning signal and the sensing signal provided from the barcode scanner 42 and the mobile phone identification sensor 44 (S40).

If the end-of-life mobile phone is normal, the control unit 40 provides the identification information to the motor synchronization control unit 74, and the motor synchronization control unit 74 applies an identification signal associated with the identification information to the motor 72 so that the end-of-life mobile phone is carried in the first direction and put into the storage device 54 (S42). After that, the control unit 40 may output a user interface of FIG. 16 to the user interface device 30 to inform the registrant that the process is completed.

In addition, the control unit 40 stores the end-of-life mobile phone in the storage device 54 and transmits the registration information and the mileage information to the integrated operation web server 12 to request accumulation of the mileage (S44). If the registration information and the mileage information are transmitted from the kiosk apparatus 10, the integrated operation web server 12 transmits the compensation card information and the mileage information included in the registration information to the mileage server 14, and the mileage server 14 accumulates the corresponding mileage in the compensation card of the registrant.

If the end-of-life mobile phone is abnormal, the control unit 40 provides the identification information to the motor synchronization control unit 74, and the motor synchronization control unit 74 applies an identification signal associated with the identification information to the motor 72 so that the end-of-life mobile phone is moved in the second direction and put into the discharge device 56 (S46). At this time, the control unit 40 may notify that the end-of-life mobile phone is discharged to the user interface panel 30, and the registrant may take out the abnormal end-of-life mobile phone discharged to the discharge device 56 through the outlet hole 38.

Figure 17:
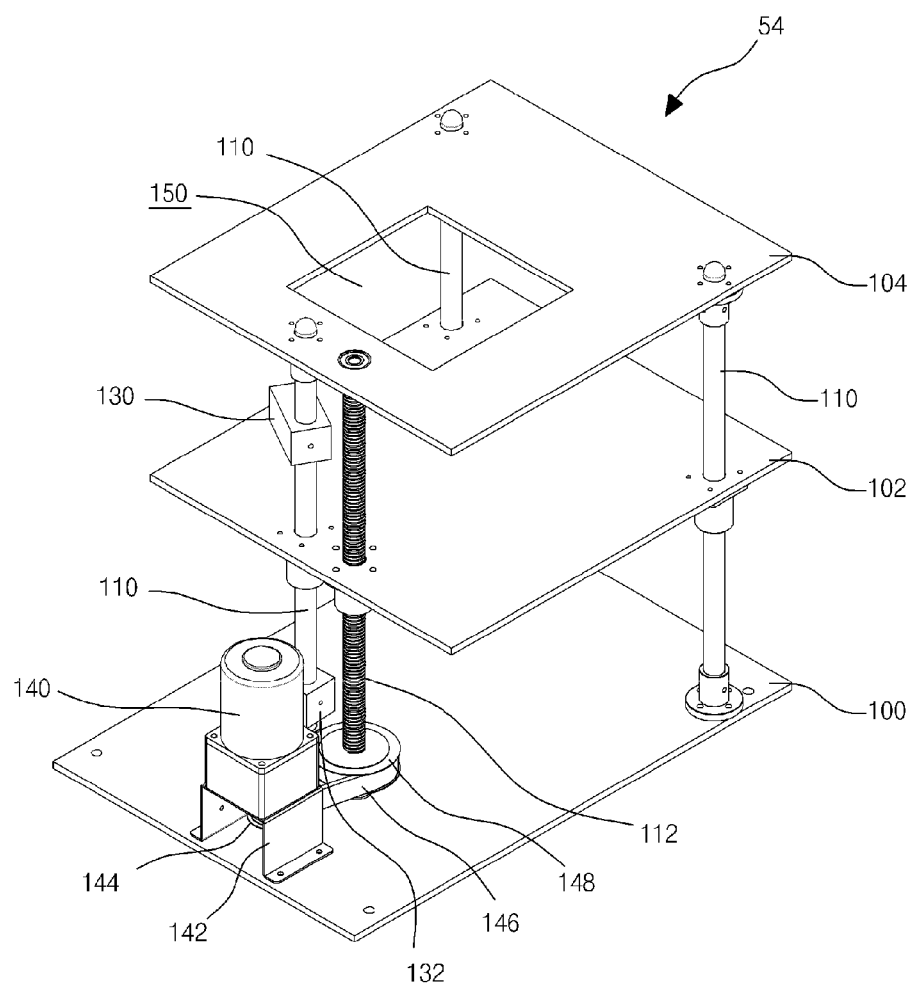
FIGS. 17 to 19 are a perspective view, a front view and a side view showing a storage device applied to a kiosk apparatus according to another embodiment of the present disclosure.
Figure 18:
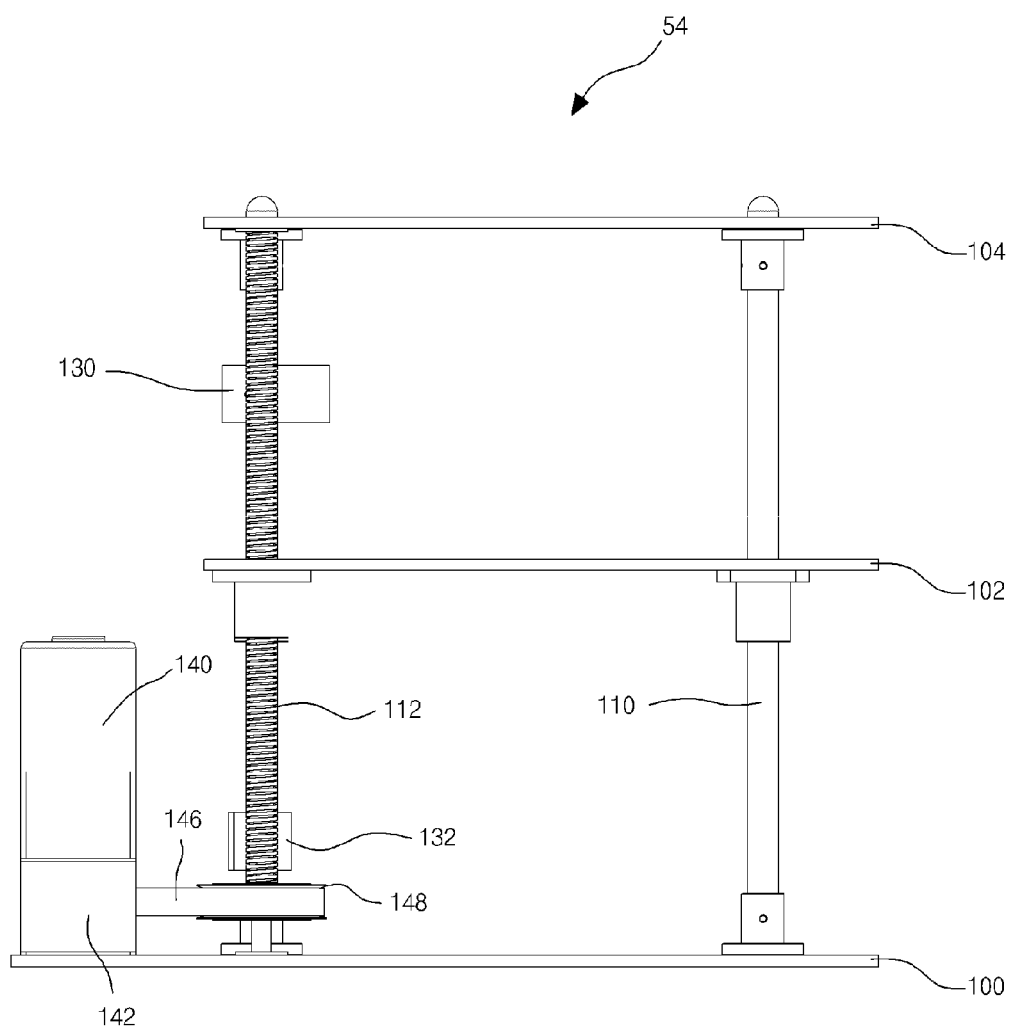
Figure 19:
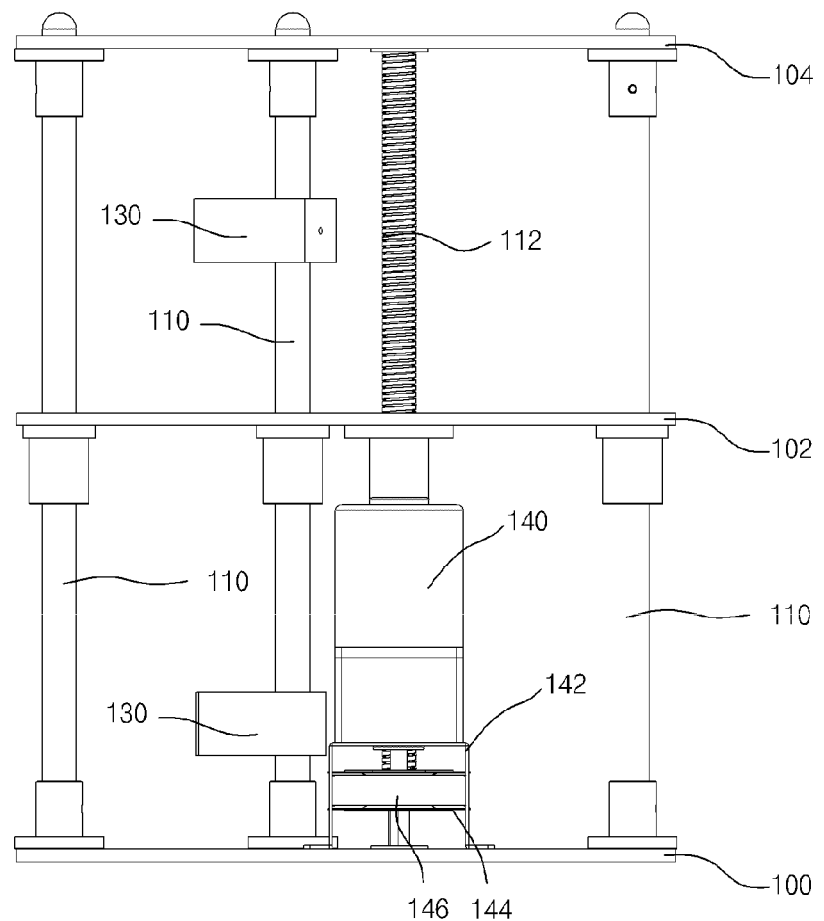
Figure 20:
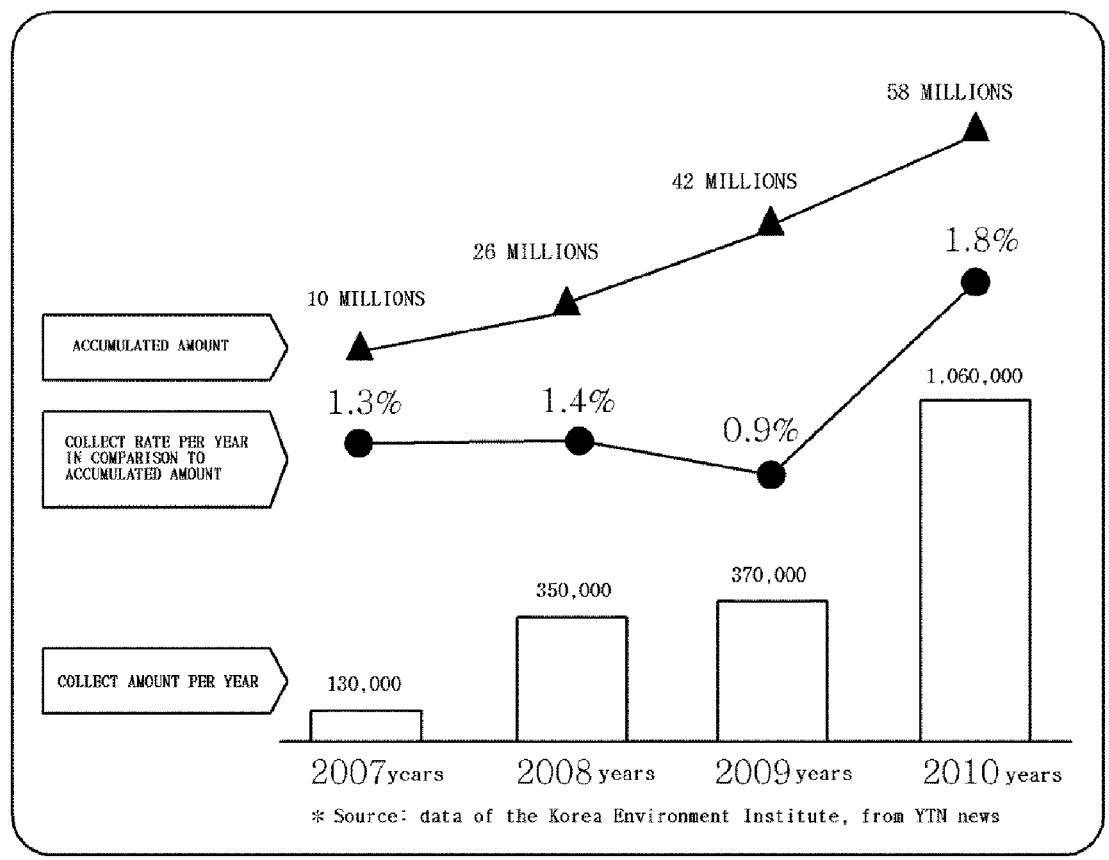
FIG. 20 shows accumulated amount, collect amount per year and collect rate of end-of-life mobile phones during last four years.
Figure 21:
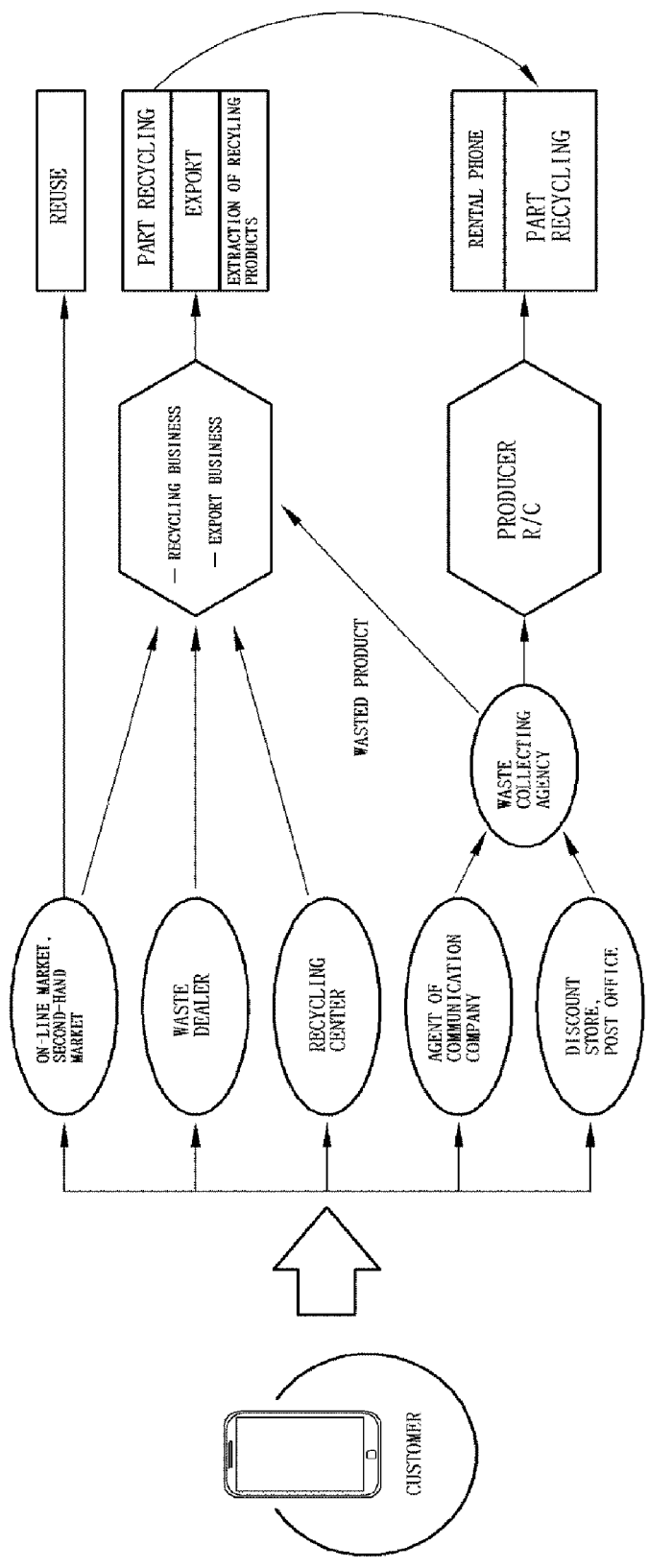
FIG. 21 shows an existing end-of-life mobile phone collecting system.
Figure 22:
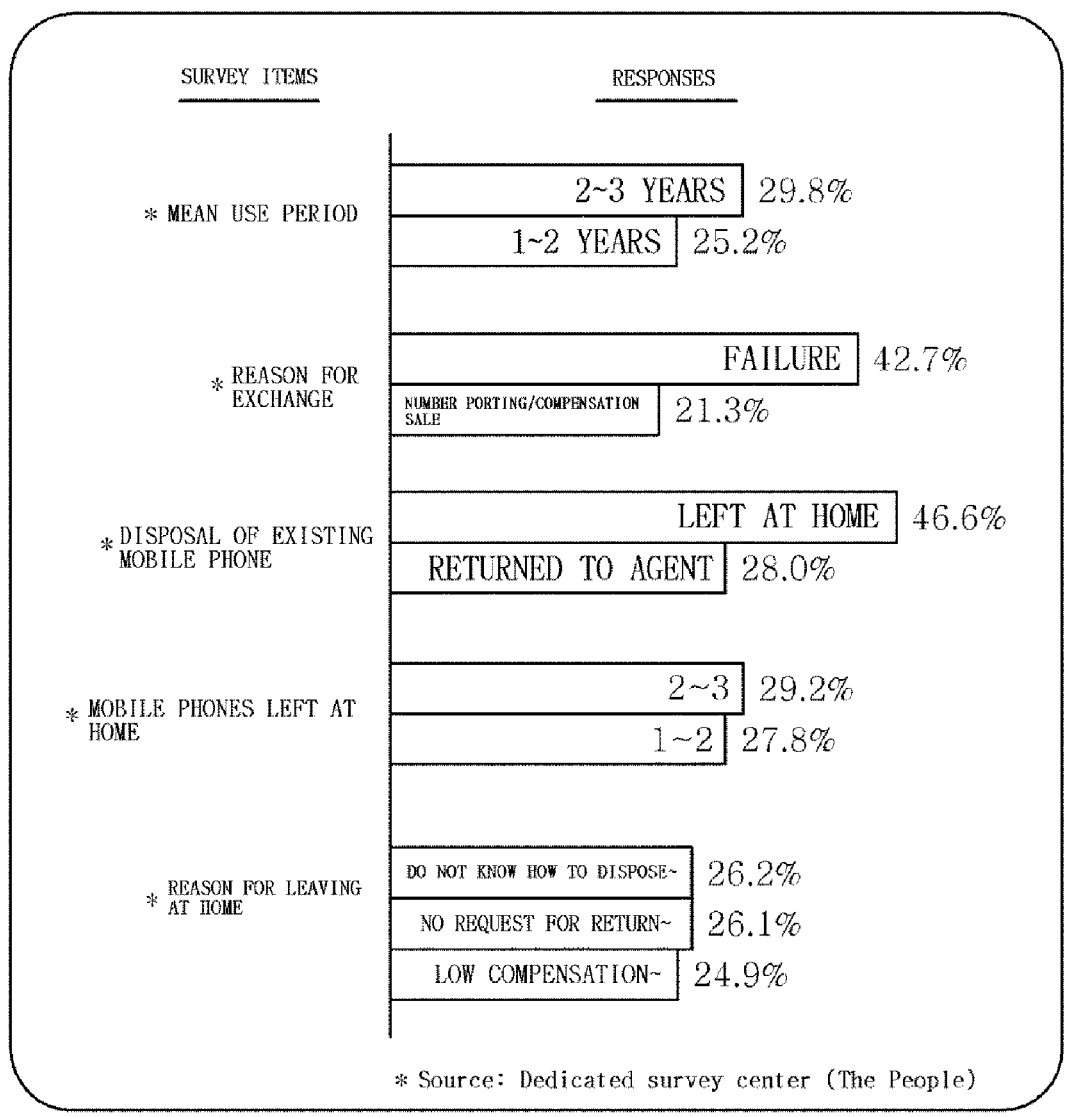
FIG. 22 shows a consumer survey results on end-of-life mobile phones.

Meanwhile, the storage device 54 of the kiosk apparatus 10 according to the present disclosure may be configured as shown in FIGS. 17 to 19. Here, FIG. 17 is a perspective view showing the storage device 54 of the kiosk apparatus, FIG. 18 is a front view of FIG. 17, and FIG. 19 is a side view of FIG. 17.

In FIGS. 17 to 19 the storage device 54 includes a base plate 100, a middle plate 102 and a top plate 104, so that the base plate 100, the middle plate 102 and the top plate 104 are vertically spaced apart from each other based on the middle plate 102. In addition, a plurality of vertical support shafts 110 and a single driving shaft 112 are installed to be spaced from each other between the base plate 100 and the top plate 104. The plurality of vertical support shafts 110 are formed through the middle plate 102 to play a role of guiding vertical movement of the middle plate 102, and the driving shaft 112 is coupled to the middle plate 102 and rotates by a driving force to vertically move the middle plate 102. Here, a pulley 148 is provided at the lower portion of the driving shaft 112 to receive a driving force, and the driving shaft 112 may be configured in a bolt form having screws on the entire outer surface thereof.

Here, a top sensor 130 and a bottom sensor 132 are installed at any one vertical support shaft 110, so that the top sensor 130 is installed above the middle plate 102 and the bottom sensor 132 is installed below the middle plate 102. The top sensor 130 and the bottom sensor 132 are used for limiting a vertical movement distance of the middle plate 102. Accordingly, it is possible to prevent the vertically moving middle plate 102 from colliding with the top plate 104 at the above or the base plate 100 at the below.

In addition, an electric motor 140 is provided on the base plate 100. The electric motor 140 is coupled to a bracket 142 and mounted to the upper portion of the base plate 100, and the electric motor 140 and a shaft-coupled pulley 144 are provided in a lower portion formed by the bracket 142. A belt 146 is provided between the shaft-coupled pulley 144 of the electric motor 140 and the pulley 148 of the driving shaft 112, and the rotation force of the pulley 144 driven by the electric motor 140 is transferred to the pulley 148 by means of the belt 146.

Moreover, an opening 150 is formed in the top plate 104. On the middle plate 102, a cargo box (not shown) for accommodating an end-of-life mobile phone put into the inlet hole 36 of the kiosk apparatus may be disposed, and the opening 150 of the top plate 104 may give a passage through which the put end-of-life mobile phone may freely fall into the cargo box (not shown) on the middle plate 102.

In addition, the conveyor 70 may be located at the middle plate 102 and may also receive the end-of-life mobile phone accommodated in the cargo box and automatically identify and separately collect the end-of-life mobile phone as described above.

Moreover, the middle plate 102 may be configured to adjust its height according to an amount of loads by the spring 66 like FIG. 2, and the height of the middle plate 102 may also be adjusted according to an amount of loads by using the electric motor 140 as shown in FIGS. 17 to 19. In other words, if the amount of loads increases, the height of the middle plate 102 may lower by a certain distance according to the operation of the electric motor 140, and accordingly a loading space required for loading mobile phones in the cargo box may be adjusted. In addition, for the operation of the electric motor 140, a sensor for sensing a load weight may be further provided. In other words, the operation of the electric motor 140 may be controlled in association with a sensing signal sent from the sensor for sensing a load weight. Moreover, if the amount of loads reaches a certain level, the electric motor 140 may rotate reversely for a certain time to remove the loading space for the mobile phones.

The kiosk apparatus 10 for collecting end-of-life mobile phones configured as above may be distributed to each convenient place, and accordingly a user may easily return an end-of-life mobile phone or receive a sufficient mileage corresponding to the end-of-life mobile phone as a compensation when using a subway or shopping in a superstore, which may motivate persons to return end-of-life mobile phones.

In addition, since the kiosk apparatuses 10 installed at convenient places may be managed through the Internet by the integrated operation system including the integrated operation web server 12, a collection amount of end-of-life mobile phones may be efficiently managed and statistically analyzed.

As a result, since the collection of end-of-life mobile phones may be promoted, it is possible to solve environmental problems and give economic income as much as the collection amount of end-of-life mobile phones.

The detailed description is given by way of illustration only, and various changes and modifications within the spirit and scope of the disclosure will become apparent to those skilled in the art from this detailed description. Therefore, the embodiments of the present disclosure are not to limit the technical sprit of the present disclosure but illustrate the technical sprit of the present disclosure, and the scope of the present disclosure should not be limited thereto. The scope of the present disclosure should be interpreted by the appended claims, and all technical sprits equivalent thereto should be interpreted as falling within the scope of the present disclosure.

What is claimed is:

1. A system for collecting end-of-life mobile phones, comprising:
    a kiosk apparatus for performing an authentication procedure in which an authentication request is made using registration information including registrant information and end-of-life mobile phone information and a barcode label is issued when an authentication number is input according to the authentication request, and an identifying procedure for storing or discharging the end-of-life mobile phone by checking the presence of the barcode label attached thereto and identifying whether the mobile terminal is a normal mobile phone when the end-of-life mobile phone is put therein; and
    an integrated operation system having an operating system program to communicate with a plurality of kiosk apparatuses through a network, issue the authentication number corresponding to the authentication request of the kiosk apparatuses, and check and statistically analyze an individual or integrated collection amount of kiosk apparatuses, wherein
    the kiosk apparatus includes:
    a user interface panel having a touch screen and providing a user interface in association with the authentication procedure and the identifying procedure;
    a barcode printer for printing the barcode label;
    an authentication unit for making the authentication request when the registration information is transmitted;
    a modem for transmitting the authentication request to the integrated operation system and making real-time communication with the integrated operation system;
    a barcode printer for outputting a barcode label on which a barcode containing the registration information is printed when the authentication number corresponding to the authentication request is input to the user interface panel;
    a data storage unit for storing information provided through the user interface, the registration information and the data corresponding to the barcode;

an identifying device for performing the identifying procedure in which the end-of-life mobile phone put therein is stored or discharged by checking the presence of the barcode label attached thereto and identifying whether the mobile phone is a normal mobile phone; and a control unit for providing the user interface to the user interface panel with reference to the information of the data storage unit, controlling the authentication unit to transmit the authentication request corresponding to the registration information through the modem while storing the registration information input from the user interface to the data storage unit, controlling the barcode printer to output the barcode label when the authentication number is input through the user interface panel, and controlling the identifying device to perform the identifying procedure, wherein, the identifying device includes:

a driving device having a motor for giving a rotation force and a conveyor driven by the rotation force, the driving device carrying an end-of-life mobile phone provided on the conveyor and changing a rotating direction of the motor according to an identification signal so that a normal end-of-life mobile phone is carried to a storage location and an abnormal end-of-life mobile phone is carried to a discharge location;

a storage device disposed at the storage location to store the end-of-life mobile phone;

a discharge device disposed at the discharge location to store an abnormal end-of-life mobile phone;

a barcode scanner for scanning the barcode of the barcode label attached to the end-of-life mobile phone put by the driving device and providing the scanned barcode to the control unit;

an authentication camera for obtaining a still image for authentication of the end-of-life mobile phone;

a mobile phone identification sensor for sensing whether the end-of-life mobile phone put by the driving device is a normal end-of-life mobile phone and providing the sensing signal to the control unit; and a motor synchronization control unit for controlling the operation of the motor according to the control unit, receiving scan information input from the barcode scanner and the mobile phone identification sensor and identification information used for determining whether to store or discharge the end-of-life mobile phone according to the sensing signal from the control unit, and providing the identification signal to the driving device.

2. The system for collecting end-of-life mobile phones according to claim 1, wherein the storage device is configured so that a height of a plate thereof on which the put end-of-life mobile phone is placed is adjusted according to a weight of collected end-of-life mobile phones.

3. The system for collecting end-of-life mobile phones according to claim 2, wherein the height of the plate is adjusted by means of a spring.

4. The system for collecting end-of-life mobile phones according to claim 2, wherein a bottom surface of the plate is shaft-coupled to an electric motor, and the electric motor moves the plate upwards or downwards corresponding to the weight of collected end-of-life mobile phones.

5. The system for collecting end-of-life mobile phones according to claim 1, wherein when the end-of-life mobile phone is put onto the conveyor, the motor synchronization control unit controls the operation of the motor so that the end-of-life mobile phone reciprocates several times between the barcode scanner and the mobile phone identification sensor.

6. The system for collecting end-of-life mobile phones according to claim 1, wherein the kiosk apparatus further includes a human body sensor for sensing approach of the registrant, and wherein when the human body sensor senses the registrant, the control unit controls the user interface panel to give a screen for demanding an input of the registration information.

7. The system for collecting end-of-life mobile phones according to claim 6, wherein the kiosk apparatus further includes a sponsorship advertisement storage unit for storing a sponsorship advertisement, and wherein in a state where the human body sensor does not sense the registrant, the control unit controls so that the sponsorship advertisement of the sponsorship advertisement storage unit is provided to the user interface panel.

8. The system for collecting end-of-life mobile phones according to claim 1, wherein the kiosk apparatus further includes a compensation card reader for reading a compensation card possessed by the registrant, and wherein the control unit stores the compensation card information in the data storage unit to be included in the registrant information, and after the end-of-life mobile phone is stored in the storage device, the control unit transmits a mileage, already allocated to each kind of the end-of-life mobile phone, to the integrated operation system to be accumulated in the compensation card.

9. The system for collecting end-of-life mobile phones according to claim 1, wherein the integrated operation system includes:

an integrated operation web server for communicating with the kiosk apparatus through the network to obtain collection information including a collection amount of end-of-life mobile phones in real time, operating a tool for checking and statistically analyzing an individual or integrated collection amount of kiosk apparatuses, and issuing the authentication number corresponding to the authentication request of the kiosk apparatus through a wireless network;

an application server on which a program for counting an individual or integrated collection amount of kiosk apparatuses and statistically analyzing the collection amount to support the tool operated in the integrated operation web server is loaded; and a database server for storing the individual or integrated collection amount of kiosk apparatuses and the statistically analyzed data, managed by the application server.

10. The system for collecting end-of-life mobile phones according to claim 9, wherein the integrated operation system further includes a mileage server, and wherein the mileage server receives a mileage transmitted to the integrated operation web server by the kiosk apparatus, and the mileage of the end-of-life mobile phone is accumulated in a compensation card of the registrant.

* * * * *